(No Model.)

T. J. THOMPSON.
INSERTIBLE SAW TOOTH.

No. 286,091. Patented Oct. 2, 1883.

WITNESSES:
Fred. G. Dieterich.
Arthur L. Morrell.

INVENTOR.
Thomas J. Thompson
By Louis Bagger & Co.
ATTORNEYS.

UNITED STATES PATENT OFFICE.

THOMAS J. THOMPSON, OF BEAVER FALLS, PENNSYLVANIA.

INSERTIBLE SAW-TOOTH.

SPECIFICATION forming part of Letters Patent No. 286,091, dated October 2, 1883.

Application filed July 7, 1883. (No model.)

*To all whom it may concern:*

Be it known that I, THOMAS J. THOMPSON, a citizen of the United States, and a resident of Beaver Falls, in the county of Beaver and State of Pennsylvania, have invented certain new and useful Improvements in Insertible Saw-Teeth; and I do hereby declare that the following is a full, clear, and exact description of the invention, which will enable others skilled in the art to which it appertains to make and use the same, reference being had to the accompanying drawings, which form a part of this specification, and in which—

Figure 1:
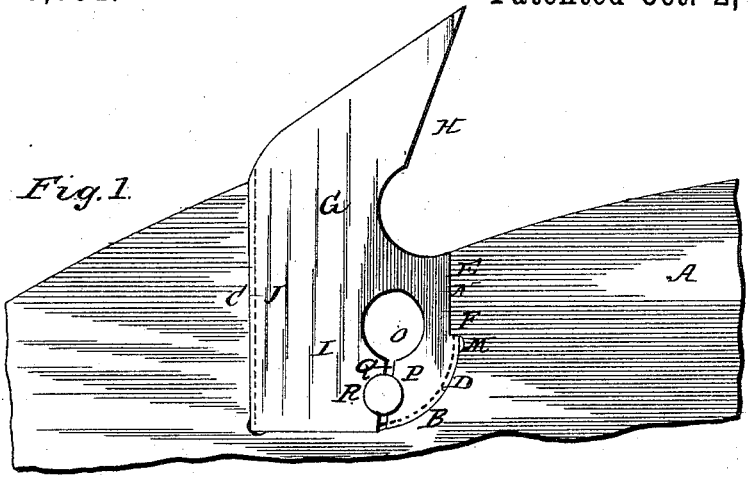
Figure 2:
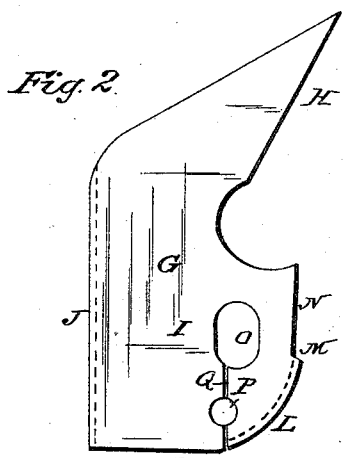
Figure 3:
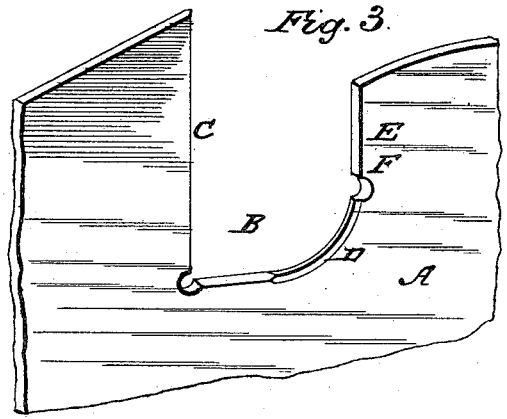
Figure 4:
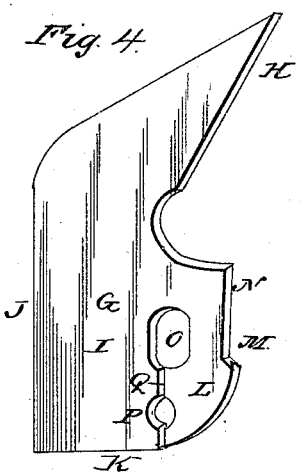

Figure 1 is a side view of a portion of a saw provided with my improved insertible saw-tooth. Fig. 2 is a similar view of the same, showing the tooth before it is riveted, forcing it to fit firmly in its notch; and Figs. 3 and 4 are detail views of the notch in the saw and the tooth detached.

Similar letters of reference indicate corresponding parts in all the figures.

My invention has relation to that class of insertible saw-teeth having a radial slot in their lower portion, adapted to receive a locking-piece, widening that end of the tooth; and it consists in the detailed construction and combination of parts of the same, as hereinafter more fully described and claimed. In saw-teeth of this class the slot in the lower end has been made with straight sides contracting to the lower end, into which a locking-piece is inserted and driven downward, expanding the lower end of the tooth and holding it in its recess in the saw; but there has been a drawback in this construction—viz., that the locking-piece has been apt to slide upward in the slot, loosening the tooth and causing it to fall out, effecting, in many instances, very serious accidents; and to prevent this I construct the slot with a large perforation at its upper end, which gives sufficient springiness to the end of the tooth to yield when inserted, and with a smaller perforation, though wider than the slot, near the lower end, into which the rivet is driven, which is upset in the same, expanding the lower ends of the tooth and securing it in the recess, precluding by its being inserted in the perforation all possibility of the rivet sliding upward and the tooth becoming loosened.

In the accompanying drawings, the letter A indicates the blade of a saw having a series of notches or recesses, B, in its edge, the one edge, C, of which, facing the direction of the cut, is straight and beveled to both sides, V-shaped in section, while the bottom of the recess is flat, extending upward in a curve, D, beveled upon the sides and V-shaped in section, and ending in a straight flat edge, E, facing from the direction of the cut and forming a shoulder, F, at the point, where the curved edge passes over into the straight edge. The tooth G consists of the pointed portion H, which extends outside the periphery of the blade and the body portion I, the rear edge, J, of which is straight, forming a V-shaped groove and corresponding to the edge of the recess, while its lower end, K, is flat, corresponding to the bottom of the recess, whereupon it curves upward, forming a curved corner, L, having a V-shaped groove, the upper end of which forms a step or shoulder, M, from which the straight and flat front edge, N, extends. The body portion of the tooth has two perforations, O and P, one somewhat larger than the other, which are connected by a slot or cut, Q, extending through the part below the lower perforation, passing out at the point, where the lower edge passes into the curved corner. This slot or cut is of about the same width as the height of the V-shaped tongues or beveled edges, so that it will allow of the lower portion of the tooth yielding or giving sufficiently to insert the same into its appropriate recess, into which it fits, when a rivet, R, is inserted into the lower perforation and upset by hammering or by pressure, expanding the rivet in width and the slotted portion of the tooth with it, forcing the grooves, tongues, and shoulders to fit into each other and hold the tooth rigidly in place. In this manner the tongues and grooves prevent lateral displacement of the tooth, while the shoulders prevent the tooth from being drawn out of the recess, and when it is desired to remove the tooth the rivet may be struck out, when the tooth may easily be removed.

I am aware, as heretofore stated, that saw-teeth have been made with a slot in their lower ends, into which a locking-piece was inserted, and I do not claim such construction, broadly; but

What I claim, and desire to secure by Letters Patent of the United States, is—

The combination of an insertible saw-tooth having a shoulder upon the forward edge of its inserted portion, and having a slot in the said portion, forming a large perforation at its upper end and a small perforation near its lower end, a saw-blade having a recess in its periphery adapted to receive the lower portion of the said tooth, and forming a shoulder in its forward edge corresponding to and fitting upon the shoulder upon the tooth, the edges of which tooth and recess are correspondingly tongued and grooved, and a rivet adapted to be inserted in the lower perforation of the slot and to be upset in the same, expanding the lower inserted portion of the tooth, as and for the purpose shown and set forth.

In testimony that I claim the foregoing as my own I have hereunto affixed my signature in presence of two witnesses.

THOMAS JEFFERSON THOMPSON.

Witnesses:
WILLIAM G. ALGEO,
SAML. Y. CALVIN.